United States Patent [19]

Carrock et al.

[11] 4,184,026

[45] Jan. 15, 1980

[54] METHOD FOR INCORPORATING NUCLEATING AGENTS IN PROPYLENE POLYMERS

[75] Inventors: Frederick E. Carrock, Paramus, N.J.; Mahendra T. Thakker, Odessa, Tex.

[73] Assignee: Dart Industries Inc., Los Angeles, Calif.

[21] Appl. No.: 970,425

[22] Filed: Dec. 18, 1978

[51] Int. Cl.$^2$ .............................................. C08F 6/00
[52] U.S. Cl. ............................... 525/4; 260/96 PC; 260/DIG. 35; 528/485; 528/486; 528/487; 528/490; 528/492; 528/494; 528/502
[58] Field of Search ................... 526/4; 528/485, 486, 528/487, 490, 492, 494, 495, 502; 260/96 PC, DIG. 35, 878 R

[56] References Cited

U.S. PATENT DOCUMENTS

| 3,326,880 | 6/1967 | Binsbergen | 528/486 |
| 3,367,926 | 2/1968 | Voecks | 526/4 |

*Primary Examiner*—Stanford M. Levin
*Attorney, Agent, or Firm*—Margareta LeMaire; Bryant W. Brennan

[57] ABSTRACT

An inexpensive yet reliable method for incorporating a minor fraction of a percent by weight of nucleating agent in a propylene polymer is provided in which the nucleating agent is dissolved at a concentration of less than 10% in a homogeneous, alcohol-based, carrier liquid having a normal boiling point of not over about 120° C. The resultant solution is atomized into a full jet spray of fine droplets which is directed with full and even coverage onto a loose pulverulent bed of propylene polymer powder over a period of time and with sufficient agitation of said bed to expose essentially all segments of the bed to direct contact with said spray.

16 Claims, No Drawings

METHOD FOR INCORPORATING NUCLEATING AGENTS IN PROPYLENE POLYMERS

FIELD OF INVENTION

This invention relates to improved methods of incorporating nucleating agents in propylene polymers.

BACKGROUND OF THE INVENTION

It is well known that a large number of higher melting particulates can be used as nucleating agents in highly crystalline polymers of propylene and other crystallizable thermoplastic polymers. As disclosed in U.S. Pat. No. 3,367,926, a wide variety of higher melting compounds will function as nucleating agents if present as small particles in the molten polymer as it solidifies upon cooling.

Many practical advantages can accrue from the proper use of effective nucleating agents in crystallizable thermoplastics. For example, as shown in U.S. Pat. No. 3,852,237, superior clarity or translucency characterizes films and articles formed from such polymer melts containing fine particulate nucleating agents in low concentrations of of from 0.001 to 0.5% by weight.

However, in commercial practice, it is difficult to achieve a completely uniform dispersion of the nucleating agent throughout the bulky mass of base polymer. In fact, it has generally been necessary to use high energy, intensive mixing equipment in order to avoid visible specks in the finished product and to use unduly prolonged mixing cycles in order to assure a uniform concentration of the finely dispersed nucleator throughout the entire base polymer in commercial scale operations.

OBJECTS OF THE INVENTION

A major object of this invention is to provide simpler and more economical procedures for achieving a uniform distribution of a minor proportion by weight of finely dispersed particles of a higher melting nucleating agent throughout a large commercial scale quantity of highly crystalline propylene polymer. Further objectives are to avoid the necessity of using high speed or high intensity mixers and to reduce energy and equipment costs. Other objects and advantages will be made more apparent from the detailed disclosure which follows.

SUMMARY OF THE INVENTION

The above objects are accomplished in accordance with this invention by dissolving the nucleating agent at a concentration of less than about 10% by weight in a carrier liquid which has a boiling point at normal atmospheric pressure or not over about 120° C. and which does not appreciably dissolve isotactic polypropylene at temperatures below 120° C.; atomizing the resultant solution into a uniform and symmetrical, full jet spray of fine droplets averaging less than about 2 millimeters in diameter and projecting said spray of fine droplets with full and even coverage onto a loose, pulverulent bed of fluffy polymer powder, of which at least about 50% by weight is composed of individual particles which are smaller than about 0.25 millimeter in equivalent spherical diameter while said bed of powder is being agitated sufficiently to expose essentially all portions thereof to direct contact with said spray at some point during the atomizing of a sufficient quantity of said solution to provide the desired proportion of nucleating agent, i.e. generally somewhere between about 0.005% and 0.5% (i.e. between about 50 and 5000 parts by weight per million parts of polymer).

The relative amount of nucleating agent solution used in forming said spray is a major factor in achieving a uniform distribution of nucleating agent in the finished polymer, and the weight ratio of said solution to fluffy powdered polymer in the bed should generally be at least 1/200 and preferably at least 1/100. This ratio corresponds to the ratio of the nucleating agent concentration in the finished polymer to the nucleating agent concentration in the sprayed solution. Therefore, the concentration of said agent in said solution should generally be no more than 200 and preferably no more than 100 times the desired concentration in said finished polymer. By the same token, the concentration of said agent in said solution should generally be at least 10 times the desired concentration in said finished polymer to avoid excessive wetting of the polymer powder bed with resultant lumping, caking, reduced flowability and extra energy requirements for vaporizing the carrier liquid.

Generally speaking, said carrier liquid can be derived from a considerable number of liquid solvents which have normal boiling points of about 60°–120° C. and which are essentially inert to the base polymer. However, water and certain lower aliphatic alcohols are excellent liquid components as will be subsequently explained herein in more detail.

DETAILED DESCRIPTION OF THE INVENTION

The major considerations in selecting ingredients for the carrier liquid of this invention are: (1) adequate solvent power to dissolve at least a substantial fraction of a percent by weight (e.g. about 0.5%) of nucleating agent; (2) inertness toward crystalline polymer (i.e. no significant chemical or solvent attack thereon); and (3) having a normal boiling point of not over about 120° C. so that it can be removed by vaporization below melting point of polymer. For use in nucleating propylene polymers, lower aliphatic alcohols and of course water generally satisfy these stated criteria for many of the most effective nucleating agents. Therefore, such alcohols and blends thereof with water are the preferred carrier liquids in this invention. Alcoholic blends containing significant proportions of water generally provide the best balance of properties, and such mixtures containing about 10 to about 50% water by weight offer the outstanding safety advantage of producing vapor mixtures which are not explosive or readily combustible in air, particularly when propyl and butyl alcohols (which have normal boiling points generally within ±20° C. of water) are used therein. In fact, certain constant boiling or azeotropic mixtures of alcohols and water are available (such as 12.5% water+87.5% isopropanol by weight), and such azeotropes constitute nearly ideal carrier liquids for the present invention.

Desirable nucleating agents for use in this invention are commonly found in the general class of metal salts of aryl carboxylic acids. A long list of exemplary compounds of this class is presented in Table I of U.S. Pat. No. 3,367,926 which is hereby explicitly incorporated in the present disclosure by this specific reference thereto. Preferred for present purposes are the alkali metal salts and particularly alkali metal salts of aryl monocarboxylic acids, such as benzoic acids. With the preferred nucleating agents, the preferred proportion of nucleating agent used in the base polymer is from about 0.01% to about 0.25% by weight (i.e. from about 100 to about 2500 ppm).

The highly crystalline polymers of primary interest here are derived predominantly from propylene (i.e. at least 75% by weight) and are produced by well known processes involving the use of stereospecific catalyst systems of the class generally referred to as Ziegler-Natta type catalysts. For example, various combinations of transition metal halides, such as titanium trichloride, with metal alkyls, such as aluminum alkyls, are often involved in such catalyst systems. Homopolymers, and copolymers of propylene with other simple 1-olefins such as ethylene and butene-1 which contain more than 80% propylene by weight, are preferred. Copolymers of propylene with ethylene containing between about 2 and about 10% by weight of ethylene are especially suitable.

It is particularly important in attaining the objects of this invention that the crystalline polymer of propylene be in a finely divided state when it is sprayed with the finely atomized, dilute solution of nucleating agent. As previously indicated, most of the particles of powdered polymer should be smaller than about 0.25 millimeter (250 microns) in equivalent diameter, and it is preferred that the mean particle size be less than 100 microns. Since crystalline polymers and copolymers of propylene are normally produced as fine powders by the polymerization reaction, the freshly prepared polymers immediately after washing them to remove catalyst residues and drying them sufficiently to place them in a fluffy, pulverulent state are ideal for use in this invention. For example, when dried to a residual volatile content of about 1 to 3% by weight, such finely particulate polymers will be free flowing, easy to handle and agitate, and will usually exhibit an apparent bulk density of not over about 25 pounds per cu. ft.

One specific preferred embodiment of this invention comprises the use of the solution spray technique described herein to introduce nucleating agent to a fluffy bed of freshly made crystalline propylene polymer during the commercial drying thereof, namely at a point where the volatile content thereof has been reduced substantially below about 5% by weight, preferably to between about 1 and 3% by weight. Since the commercial drying equipment conventionally used includes rotational agitation means for stirring the bed of fluffy polymer powder, the spraying step can readily be carried out therein by arranging suitable spray nozzles at points above the bed providing full and even coverage thereof by the projected solution spray therefrom while agitating the bed at a suitable rate. This integration of the spraying step with the conventional drying step provides many economic advantages including energy savings in taking advantage of the sensible heat already in the powdered polymer being dried and simplifying the removal of the carrier liquid from the finished polymer by accomplishing same simultaneously with the removal of the last fraction of volatile residues already in the freshly manufactured polymer.

Many different types of atomizing spray nozzle can be used to produce regular and symmetrical sprays of the solution of nucleating agent. However, the pressure atomization types are generally preferred in the practice of the present invention since they are generally more readily controllable to generate reproducible full jet sprays of definite shape in which relatively uniformly sized individual droplets can be reliably delivered to the full bed of powdered polymer.

Regardless of how the full jet sprays of fine droplets of nucleating agent solution are generated, it is desirable that same be projected directly onto the pulverulent bed of fluffy polymer powder with full and even coverage thereof. Sprays generated by the preferred pressure atomizing nozzles, normally are projected in the form of diverging (conical or pyramidal) patterns. Such nozzles are available in almost any size or flow capacity of practical interest, having total angles of divergence up to about 90°. Accordingly, regardless of the size and shape of the pulverulent bed of polymer powder, spray nozzles can be arranged to provide full and even coverage thereof. However, the relatively wider angled nozzles are likely to be most practical for commercial operations, since their spray patterns cover a wider bed area for a given spacing distance from the bed and thus tend to reduce the total number of nozzles required in a given situation.

As previously indicated, the quantity of nucleating agent solution employed in providing the desired concentration of nucleating agent in the finished polymer is a very important consideration in this invention. Thus, the amount of solution used should be at least about 1/200th and preferably at least about 1/100th by weight of the polymer in order to provide extended contacting opportunity throughout the bulky polymer mass, as for example by providing sufficient spray application time in which to agitate the fluffy polymer powder bed and thus expose all portions thereof to direct contact with the spray. For example, using multi-blade or paddle type agitators radially mounted on a rotary shaft running through the middle of a generally horizontal bed of a few feet in depth, operation at around 10 to 30 revolutions per minute provides adequate exposure of all parts of bed which is fully covered by a projected spray of solution for at least a few minutes. The most desirable range of ratios of said solution for use with well agitated polymer powder beds appears to lie between about 1/100th and about 1/20th by weight of the polymer. Larger proportions of such solutions should not be resorted to unless necessary to achieve adequate overall wetting of an unusually large (deep) or poorly agitated bed or because of low solubility of the nucleating agent in the carrier liquid. As indicated earlier, the concentration of nucleating agent in the sprayed solution should always be at least 10 times the desired concentration in the finished polymer in order to avoid adding such large proportions of solution (i.e. over 10% by weight) as to detract from the free flowing character of the bed and cause problems in drying the finished polymer by vaporizing the carrier liquid therefrom.

It is generally preferred that the carrier liquid be sufficiently volatile to be removed by vaporization without applying partial vacuum or using subatmospheric conditions. However, in addition to applying heat to the fluffy bed of polymer powder indirectly, e.g. by means of steam jackets or electric heaters applied to the container walls, the passage of a hot inert sweep gas slowly through the bed is also helpful in drying the polymer product to the final state desired (usually no more than a minor fraction of percent of residual volatile content) without heating the bulk polymer to an excessive temperature. In this way, carrier liquids, including components such as $C_4$ monohydric alcohols having boiling points up to about 120° C., can be used and successfully vaporized out of the polymer product without damaging same. Once the volatile content of the polymer product has been reduced to the order of only 0.1 or 0.2% by weight, it can then be satisfactorily melt processed or fabricated by conventional methods into other forms and/or finished articles. For example, it can be extruded to form granules or films, and/or blow molded or otherwise shaped into bottles or other useful structures.

Other special function additives are often incorporated in crystalline propylene polymers in minor proportions, such as antioxidants, antistatic agents, stabilizers, antiblocking agents, lubricants, etc. In most cases, these materials can be added to the freshly prepared polymer at any time, e.g. either before or after the nucleating agent solution has been sprayed onto the polymer. However, when lubricants such as silicones, metal stearates, etc., are to be used in a polymer which is to be nucleated in accordance with this invention, it is recommended that the spraying of the nucleating agent solution onto the agitated bed of fluffy polymer powder be completed before the lubricant additives are introduced to the polymer in order to avoid possible interference by the lubricant in achieving thorough and uniform wetting of the polymer powder by said solution.

Various details of our invention will be more fully understood in the perspective of the specific illustrative embodiments described in the following examples.

EXAMPLE 1

Eight thousand pounds of a freshly polymerized propylene-ethylene copolymer containing about 2% by weight of ethylene, following catalyst deactivation and purification by washing with hot solvent to remove catalyst residues and reduce atactic content, was dried to a volatile content of between 1 and 2% by weight while agitating same in a steam heated, annular jacketed, elongated horizontal drier. The drier was about 16 feet long and about 5 feet wide in the upper portion with a smoothly rounded (semicylindrical) bottom section having a radius of curvature of almost 2.5 feet, and was equipped with a multibladed agitator consisting of radial arms or blades mounted on a rotatable shaft extending through the drier at approximately the focal point axis of the rounded bottom section.

This nearly dried copolymer was a fluffy powder, over half of which by weight was finer than 80 mesh (Tyler Series) and it formed a pulverulent bed having U-shaped cross section nearly 5 feet deep at the center line of the drier. The only additive incorporated into the polymer at this point was about 0.1% by weight of a hindered phenolic antioxidant which had been thoroughly mixed into the nearly dried polymer powder. A small sample of this fluffy powder was removed and set aside to serve as a sample of unnucleated copolymer before proceeding to incorporate about 300 ppm of sodium benzoate into the balance thereof using the following procedure.

A solution containing about 1.5% sodium benzoate by weight was prepared by dissolving 2.4 lbs. of sodium benzoate in 157.5 lbs. of an azeotropic mixture of water (12.5%) and isopropanol (87.5%). While rotating the multiblade agitator at 18 rpm, the resulting solution was atomized through four full-jet spray nozzles directed toward the surface of the agitated bed of hot fluffy polymer powder. The nozzles were No. ¼HH12SQ pressure-type spray nozzles made by Spraying System Co. of 316 stainless steel, providing a full jet, square or pyramidal spray pattern with about a 70° angle of divergence. They were positioned along a line somewhat more than 3 feet above the center of the bed at distances about 2, 6, 10 and 14 feet from either end of the drier so that the spray pattern from each nozzle covered at least a 4'×4' section of the upper surface of the bed, thus providing substantially full and even coverage of the entire bed. The entire 160 lbs. of nucleating solution was pressure atomized through the four nozzles into fine droplets mostly less than about 1 millimeter in diameter (and averaging less than 2 mm in diameter) at a rate of about 10 lbs. per minute, thus providing full spray delivery for about 15 minutes, thereby enabling substantially all parts of the agitated bed to be contacted by atomized solution at some point during the spraying operation.

After all the solution had been sprayed onto the bed, the polymer particles were dried to a volatile content of approximately 0.1% by weight using approximately 125° C. steam in the annular jacket around the drier and passing a sweep stream of 110° C. nitrogen slowly through the polymer powder bed while continuing to rotate the multibladed agitator at 18 rpm.

Samples of this dried copolymer powder containing about 300 ppm of sodium benzoate were then tested for peak freezing point by differential thermal analysis of time scans of slowly cooled melts in a scanning calorimeter and, for comparison purposes, similar measurements were made on the previously reserved sample of the same copolymer before addition of any sodium benzoate [after first drying same further to reduce the volatile content thereof to the same level (0.1%) as that of the nucleated material]. It was thus found that the freezing point of the nucleated polymer was almost 10° C. higher than that of the unnucleated material (112°–113° C. vs 103°–104° C.).

Portions of the respective nucleated and unnucleated copolymer described above were also converted to pellets by melt extrusion. Standard physical testing of tensile, Izod and flexural modulus specimens molded from said pelletized materials revealed that nucleating this polymer with 300 ppm of sodium benzoate yielded a dramatic improvement in impact strength as well as significantly higher heat deflection temperatures and somewhat greater stiffness and modulus values.

Two additional runs were made using exactly the same procedural steps described above except that the amount of sodium benzoate dissolved in the carrier liquid was 3.6 pounds in one run (≃ 450 ppm in finished polymer) and 1.2 pounds in the other (≃ 150 ppm). Again the resulting nucleated polymers were tested for peak freezing point by the DTA method, and it was found the freezing points of these finished products were about 114° C. and about 108° C. respectively.

Similar results and improvements were obtained when instead of the above described ethylene-propylene copolymer, a similar propylene copolymer containing about 5 to 6% ethylene by weight was employed.

EXAMPLE 2

The detailed procedure described in the first part of Example 1 was repeated except that 8000 pounds of a polypropylene homopolymer having a similar melt index of about 2 dg/min was processed to incorporate a total of about 2.4 pounds of sodium benzoate (≃ 300 ppm) therein.

Likewise, DTA tests in a scanning calorimeter conducted on essentially dry samples of homopolymer before and after incorporation of the nucleating agent indicated an increase of about 10° C. in freezing point due to the resulting nucleation effects (about 122° C. for nucleated material vs 112° C. for the original homopolymer). Significant improvements in physical properties due to nucleation effects in the homopolymer were also shown although the margin of superiority was not as dramatic as with the copolymer material processed in Example 1.

Similar results and improvements were also obtained when the polypropylene homopolymer of this Example was replaced by a block type copolymer of propylene produced by grafting onto a propylene homopolymer trunk pendant blocks of copolymerized propylene and ethylene wherein the ethylene content represents about 40% by weight of the pendant block copolymer and almost 10% by weight of the total grafted polymer.

In addition to the specific improvements already recorded in the above illustrative examples, it should be noted that test specimens, extruded films and molded articles fabricated from the sodium benzoate containing products of the above Examples also uniformly exhibited excellent clarity and remarkable freedom from visible specks or cloudiness.

Many additional variations and substitutions can be practiced in the above illustrative Examples as will be obvious to those skilled in the art. For example, other metal salts, such as those of potassium and/or aluminum, and/or salts of other arylcarboxylic acids, including substituted benzoic acids such as para-t-butyl benzoic acid and the like can be used as nucleating agents. Also, many other relatively volatile alcoholic liquids can be used as the solvent carrier for the nucleating agents, including both other azeotropic mixtures with water (e.g. 71.7% n-propyl alcohol + 28.3% water) and non-azeotropic mixtures such as aqueous ethanol combinations containing about 10 to 40% water.

That which we define as our invention is, therefore, specified in the explicit claims which follow.

What is claimed is:

1. A process for uniformly incorporating a minor amount of a nucleating agent in a highly crystalline polymer of propylene which has a lower melting point than said agent comprising dissolving said nucleating agent at a concentration of less than about 10% by weight in carrier liquid having a normal boiling point of not over 120° C. and insignificant solvating action toward said polymer below 120° C., atomizing the resultant solution into a uniform and symmetrical, full jet spray of fine droplets averaging less than about 2 millimeters in diameter and directing said spray with full and even coverage onto a loose pulverulent bed of said polymer in the form of fluffy powder particles predominantly smaller than about 0.25 millimeter in equivalent spherical diameter while agitating said bed to expose essentially all portions thereof to direct contact with said spray at some point during the atomizing of a sufficient quantity of said solution to provide between about 50 and about 5000 parts by weight of said nucleating agent per million parts of said polymer.

2. A process as in claim 1 wherein said polymer of propylene contains at least 80% by weight of propylene and is derived substantially entirely from 1-monoolefins, said nucleating agent is a metal salt of an arylcarboxylic and the proportion of said nucleating agent is between about 100 and about 2500 ppm.

3. A process as in claim 2 wherein said carrier liquid is composed essentially of aliphatic monohydric alcohols containing less than five carbon atoms or mixtures of same with water.

4. A process as in claim 3 wherein water comprises between about 10 and about 50% of said carrier liquid by weight.

5. A process as in claim 4 wherein said carrier liquid is an azeotropic mixture of water and alcohol.

6. A process as in claim 2 wherein said nucleating agent is an alkali metal salt of benzoic acid or a substituted benzoic acid.

7. A process as in claim 6 wherein said nucleating agent is an alkali metal salt of benzoic acid.

8. A process as in claim 7 wherein said nucleating agent is sodium benzoate.

9. A process as in claim 1 wherein said pulverulent bed is an elongated substantially horizontal bed having an approximately U-shaped configuration and said bed is agitated by means of a multi-bladed paddle type agitator having radially extending blades or paddles mounted at frequent intervals all along a rotary shaft running longitudinally through the middle of said bed.

10. A process as in claim 9 wherein the axis of said shaft is aligned with the center of curvature of the rounded bottom section of said U-shaped configuration.

11. A process as in claim 10 wherein said shaft is rotated at a speed of between about 10 and about 30 rpm.

12. A process for uniformly incorporating between about 0.05% and about 0.5% by weight of a nucleating agent in a freshly made, solvent washed, crystalline polymer of propylene which is either a homopolymer or a propylene-ethylene copolymer containing more than 80% by weight propylene at a point where the subsequent drying of said solvent washed crystalline polymer has reduced the volatile content thereof below about 5% by weight comprising dissolving said nucleating agent in a carrier liquid composed essentially of aliphatic monohydric alcohols containing less than five carbon atoms or mixtures of same with water at a concentration of less than 10% by weight and which concentration is at least 10 but not over 200 times the ultimate concentration at which said agent is to be incorporated in said polymer, atomizing the required amount of resultant solution into a uniform and symmetrical, full jet spray of fine droplets averaging less than about 2 millimeters in diameter and directing said spray with full and even coverage onto a loose pulverulent bed of said polymer in the form of fluffy powder having a mean particle size of less than 0.1 millimeter while agitating said bed to expose essentially all portions thereof to direct contact with said spray at some point during atomization of the total amount of said solution required to provide said ultimate concentration of nucleating agent in said polymer, and then continuing to agitate said bed while removing said carrier liquid and other volatiles by vaporization thereof until the volatile content of said polymer has been reduced to about 0.1% by weight.

13. A process as in claim 12 wherein said nucleating agent is a metal salt of an arylcarboxylic acid and the ultimate concentration of said nucleating agent in said polymer is between about 100 and about 2500 ppm.

14. A process as in claim 12 wherein water comprises between about 10 and about 50% of said carrier liquid by weight.

15. A process as in claim 12 wherein the said solution is atomized by means of a series of full jet, pressure type spray nozzles each of which is positioned above the center of said bed at a height and longitudinal spacing such that the spray from each nozzle covers substantially the full width of the upper surface of said bed and a longitudinal segment thereof about equal to said width.

16. A process as in claim 15 wherein the bed of material is confined in a horizontal drum type dryer having an annular jacket equipped with a source of heating fluid.

* * * * *